United States Patent [19]

Kennedy

[11] 3,976,262
[45] Aug. 24, 1976

[54] MAGNETIC TAPE CARTRIDGE RECORDER HAVING RELEASABLE CARTRIDGE CATCH ARRANGEMENT AND NON-RESONANT TYPE DRIVE

[75] Inventor: Charles J. Kennedy, Pasadena, Calif.

[73] Assignee: C. J. Kennedy Company, Altadena, Calif.

[22] Filed: Dec. 17, 1973

[21] Appl. No.: 425,301

[52] U.S. Cl. .................................. 242/192; 360/96
[51] Int. Cl.² ..................... G03B 1/04; G11B 15/32
[58] Field of Search ........... 242/192, 198, 201, 202, 242/203, 206, 209; 360/93, 96

[56] References Cited
UNITED STATES PATENTS

| | | | |
|---|---|---|---|
| 3,475,031 | 10/1969 | Kuehnlein | 242/198 X |
| 3,524,651 | 8/1970 | Ketzer | 360/96 |
| 3,593,946 | 7/1971 | Shardlow | 242/192 |
| 3,599,985 | 8/1971 | Huber | 360/93 |
| 3,612,541 | 10/1971 | Huber | 360/93 |
| 3,617,065 | 11/1971 | Camras | 360/93 |
| 3,650,495 | 3/1972 | Boyer | 242/192 |
| 3,692,255 | 9/1972 | Von Behren | 242/192 |
| 3,851,840 | 12/1974 | Bastiaans | 242/198 |

*Primary Examiner*—Leonard D. Christian
*Attorney, Agent, or Firm*—Fraser and Bogucki

[57] ABSTRACT

A recorder slidably receives the opposite edges of a magnetic tape cartridge within grooved guides and locks the cartridge in an operative position using an opposite pair of movable catches which engage notches in the opposite edges of the cartridge. Cartridge ejection is effected by energizing a solenoid which pulls the opposite catches out of the cartridge edge notches along enough for a pair of spring-loaded elements to push the cartridge forward out of the operative position. A wheel located within the cartridge and coupled to drive a length of magnetic tape therein is engaged with and driven by a drive wheel when the cartridge is in the operative position. The drive wheel is mounted on a drive shaft having an end thereof opposite the drive wheel rotatably supported by a bearing and an opposite portion thereof adjacent the drive wheel supported by another bearing which is resiliently mounted by a spring within an aperture at the top of the housing for the recorder. A motor mounted within the housing provides positive, non-resonant driving of the drive wheel via a bevelled wheel mounted on the motor shaft and having a resilient outer periphery thereof engaged with a second bevelled wheel mounted on the drive shaft adjacent the first-mentioned bearing.

5 Claims, 10 Drawing Figures

MAGNETIC TAPE CARTRIDGE RECORDER HAVING RELEASABLE CARTRIDGE CATCH ARRANGEMENT AND NON-RESONANT TYPE DRIVE

BACKGROUND OF THE INVENTION

1. Field of the Invention

The present invention relates to magnetic recorders, and more particularly to magnetic recorders of the type in which a magnetic tape contained within a removable cartridge is driven in bidirectional, intermittent fashion to effect digital operation.

2. History of the Prior Art

With the increasing use of magnetic tape recorders in the recording and playback of information in connection with data processing operations, there has been developed a type of tape recorder in which the magnetic tape is completely contained within an enclosed cartridge together with supply and take-up reels and an elastomeric band which rides over a plurality of idlers or rollers. The band is also wrapped around a driven wheel principally contained within but exposed to the outside of the cartridge. Driving of this driven wheel effects driving of the magnetic tape via the elastomeric band. Drive systems of this type enable maintenance of tape tension and tape motion with a single drive motor. In particular, they greatly facilitate the insertion of a reel of magnetic tape into a recording system and the subsequent removal of the tape reel therefrom. Instead of having to load the tape reel onto the recorder and thread the tape through a tortuous path to the opposite reel via a tedious handloading operation or by means of a complex self-threading arrangement, with the tape thereafter being driven under control of a complex arrangement of idlers, rollers or pneumatic devices, one or more capstans with or without pinch rollers and a plurality of tape tensioning devices such as vacuum columns, it is only necessary to slide the cartridge into an operative position within the recorder so that the driven wheel is engaged by a drive wheel and associated motor system contained within the recorder. When it is desired to remove or exchange the tap, the cartridge is readily removed from the recorder by hand, following which the next cartridge is slid into place in like fashion.

While tape recorders of the type utilizing tape cartridges as described above provide a number of notable advantages for certain magnetic tape applications, conventional recorders of that type suffer from a number of disadvantages. One of the more prevalent problems arises from the manner in which the tape cartridge is installed within the recorder. In many systems the cartridge is simply jammed into place in the operative position. The cartridge may be held in the operative position by friction alone or by a rather crude arrangement of elastomeric or spring-loaded devices intended to maintain the cartridge in place. Such mounting systems lack the clear and positive type of action which is frequently desired in such systems. They do not permit the cartridge to be secured in the operative positiotn while substantial pressure is exerted on the driven wheel by the driving system of the recorder. Moreover such arrangements do not lend themselves to positive and automatic ejection of the cartridge upon termination of operation.

A further problem with prior art tape recorders of the tape described relates to the manner in which the driven wheel of the tap cartridge is driven. Many of the prior art systems make use of a pivotably mounted arm which may be spring loaded and which has a motor and associated drive wheel mounted at the free end thereof. The tension of the spring pulls the arm in an appropriate direction so as to engage the drive wheel with the drive wheel of the cartridge when the cartridge is in the operative position. In such arrangements the tension with which the drive wheel is held against the driven wheel of the cartridge is usually limited because of cartridge design considerations. A more serious difficulty arises from the fact that the lever arm mounting of the motor results in resonance which eventually causes a bouncing of the drive wheel with respect to the driven wheel. Further problems arise from the fact that the motor is mounted on the lever arm and therefore plays a substantial role in determining the tension of the drive wheel on the driven wheel. Thus where the recorder assumes one particular orientation, the weight of the motor may increase the tension substantially as compared with other orientations where motor weight is a relatively minor factor.

Accordingly it would be advantageous to provide an arrangement for catching the installed tape cartridge and locking it into operative position in quick and positive fashion. It would, furthermore, be advantageous to provide such an arrangement which would release and partially eject the tape cartridge from the recorder in quick and positive fashion, with such action being performed automatically and electrically where desired.

Further advantages would flow from an arrangement in which the drive wheel is capable of engaging the driven wheel of the cartridge under relatively high tension, and in such fashion that the tension is not affected by factors such as motor weight. Still further advantages would arise from such a system in which undesirable resonant action does not occur so as to interfere with the driving of the driven wheel by the drive wheel.

BRIEF SUMMARY OF THE INVENTION

The present invention provides a magnetic tape cartridge recorder in which the tape cartridge is readily and positively latched into its operative position by a simple sliding motion of the cartridge into the recorder by hand. The cartridge remains locked in the operative position until it is desired to eject the cartridge, at which point the cartridge is automatically released from the operative position and partially ejected. It is then a very simple matter to completely remove the cartridge from the recorder by hand. The driven wheel of the cartridge is engaged by a drive wheel which is coupled to a drive motor via a resilient connection which prevents undesirable resonant actions. The positive locking of the tape cartridge in the operative position together with the particular mounting and driving arrangement for the drive wheel enable the drive wheel to be engaged with the driven wheel in positive fashion and under relatively high tension where desired. The drive motor is remote from the drive wheel and does not significantly affect the tension with which the drive wheel is engaged with the driven wheel.

In one preferred embodiment of a magnetic tape cartridge recorder in accordance with the invention, the cartridge is installed in the recorder by engaging the opposite edges of the cartridge within grooves in a pair of opposite guides mounted on the top of the recorder and sliding the cartridge along the guides by hand.

When the operative position is reached a pair of opposite catches pivotably mounted on the recorder in the region of the grooves and which are normally biased into first or engaged positioned by associated springs engage notches in the opposite edges of the cartridge to lock the cartridge firmly in place in the operative position. The driven wheel of the cartridge is engaged with the drive wheel under a desired amount of tension. The drive wheel is mounted on the end of a drive shaft which has an opposite end thereof rotatably mounted within a bearing inside the housing of the recorder. A portion of the drive shaft adjacent the drive wheel is rotatably held by another bearing resiliently mounted within an aperture at the top of the recorder housing by a spring. The spring urges the upper bearing and adjacent drive wheel in the direction of the tape cartridge to maintain positive engagement between the drive and driven wheels under high tension. A drive motor mounted inside the housing and remote from the drive wheel is coupled to the drive wheel via a pair of bevelled wheels, one of which is mounted on the motor shaft and the other of which is mounted on the drive shaft adjacent the lower bearing. The outer peripheral portions of the bevelled wheels where mutual contact is made are of resilient material. The location of the motor in addition to use of the resilient bevelled wheels greatly minimizes or eliminates the possibility of undesired resonance. When operation in connection with the particular tape cartridge is completed a solenoid is energized to move the catches out of their engaged positions within the notches at the opposite edges of the cartridge against the urging of the associated springs. At the same time a pair of spring-loaded elements pivotably mounted adjacent the different catches and which normally bear against the tape cartridge under prressure operate to force the cartridge out of the operative position and thereby effect a partial ejection of the cartridge. Thereafter the cartridge is simply slid out and removed by hand.

BRIEF DESCRIPTION OF THE DRAWINGS

The foregoing and other objects, features and advantages of the invention will be apparent from the following more particular description of a preferred embodiment of the invention, as illustrated in the accompanying drawings, in which.

DETAILED DESCRIPTION

FIGS. 1–4 illustrate a magnetic tape cartridge recorder 10 in accordance with the invention togetehr with a tape cartridge 12 therefor. The recorder 10 is comprised of a hollow, generally rectangular housing or frame structure 14 having a generally planar member 16 thereof which forms a front-top surface for the recorder 10. A front panel 18 includes push buttons and indicator lights coupled to the internal electronics for the recorder 10. Such internal electronics which comprise in part a plurality of printed circuit cards 20 include write electronics comprising drivers for a dual gap read-after-write head 22 mounted on the planar member 16 and read electronics including preamplifiers, crossover detectors and phase lock electronics. A separate erase head 24 is mounted in conjunction with the magnetic head 22.

Figure 1:
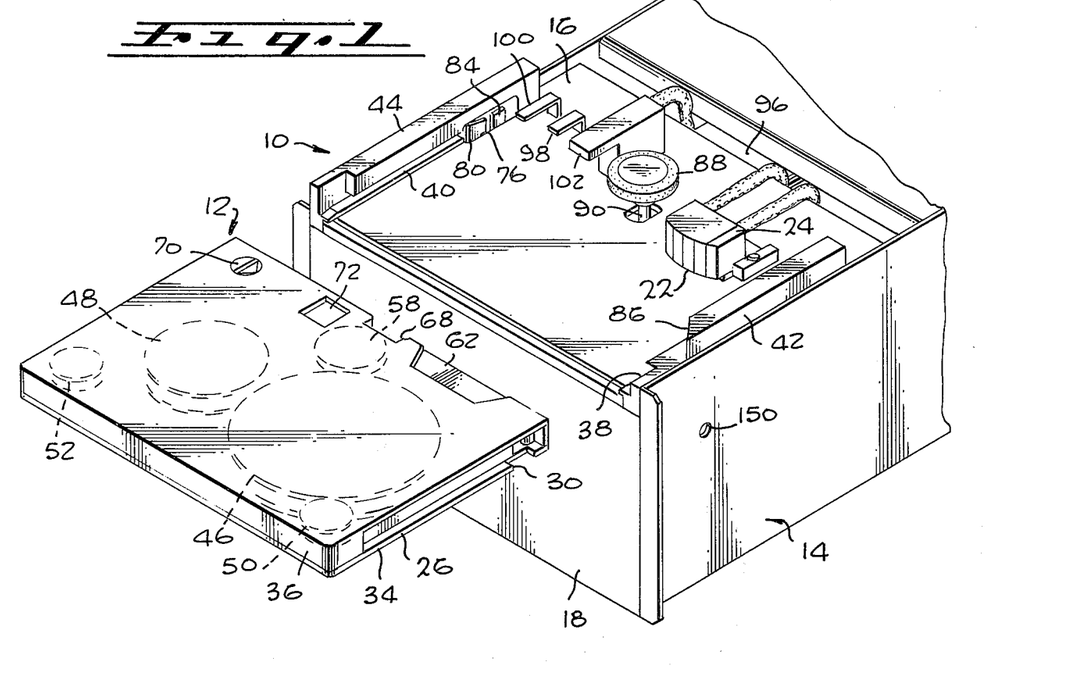
FIG. 1 is a perspective view of a magnetic tape cartridge recorder in accordance with the invention illustrating the manner in which the tape cartridge is slid into an operative position in the recorder.
Figure 2:
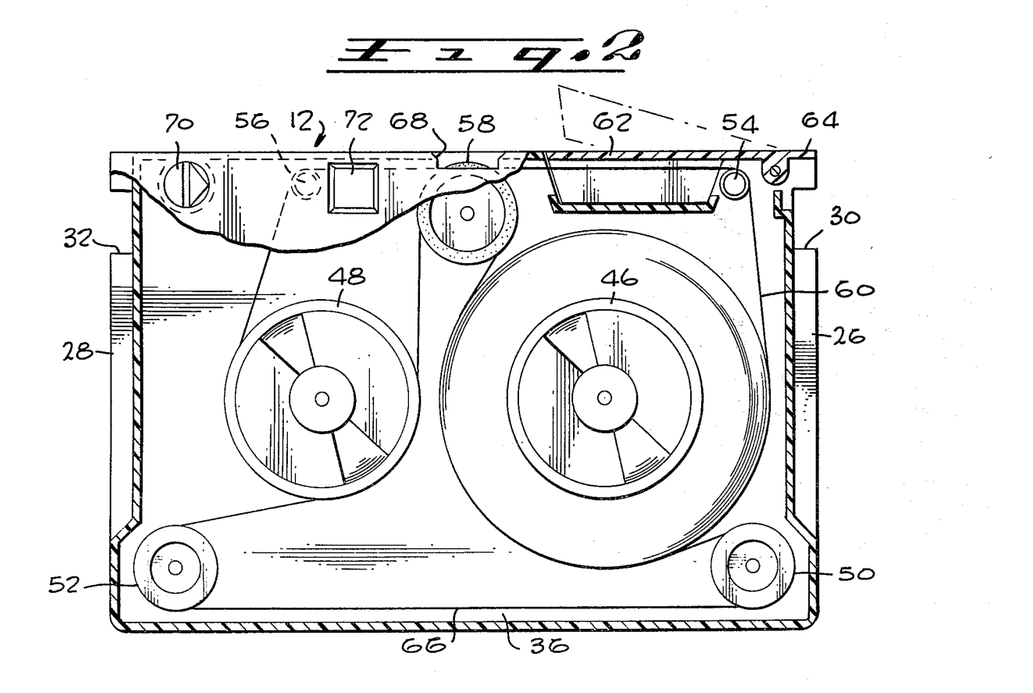
FIG. 2 is a plan view of the magnetic tape cartridge of the FIG. 1 arrangement.

The magnetic cartridge 12 has a pair of opposite edges 26 and 28 which include notches 30 and 32 respectively at the forward ends thereof. The opposite edges 26 and 28 are formed by a thin, planar base 34, typically comprised of aluminum, for the cartridge 12. A hollow, generally rectangular frame 36 of clear plastic is mounted on the base 34 to define the thin, rectangular outline of the cartridge 12. The opposite edges 26 and 28 of the cartridge 12 may be engaged within grooves 38 and 40 within opposite guides 42 and 44 respectively to facilitate sliding movement of the cartridge 12 into an operative position on top of the recorder 10. The guides 42 and 44 are mounted at the opposite edges of the planar member 16 at the top-front of the housing 14 for the recorder 10.

The details of the cartridge 12 may be better understood with specific reference to FIG. 2. The cartridge 12 includes supply and take-up reels 46 and 48 respectively which are rotatably mounted within the cartridge frame 36 together with a pair of idler wheels 50 and 52, a pair of guide posts 54 and 56 and a driven wheel 58. A length of magnetic tape 60 extends between the supply and take-up reels 46 and 48 via a path which includes the guide posts 54 and 56. A portion of the tape 60 is exposed at the front edge of the cartridge 12 by a door 62 which is pivotably mounted at one end and which is spring loaded at the pivot so as to normally remain closed but so as to be opened against the tension of the spring whenever a tab 64 on the opposite side of the hinge from the door 62 is engaged and pushed in. A partially opened position for the door 62 is shown in dotted outline in FIG. 2.

An endless elastomeric belt 66 is wound around the idler wheels 50 and 52 and the driven wheel 58 as well as being engaged with a portion of the outer peripheries of the tape packs on the reels 46 and 48. Upon rotation of the driven wheel 58 and belt 66 moves in fashion so as to rotate the reels 46 and 48 and drive the magnetic tape 60. A small portion of the outer periphery of the driven wheel 58 is exposed to the outside of the cartridge 12 for engagement by a drive wheel as described hereafter by means of an aperture 68 in the front edge of the frame 36 for the cartridge 12.

The cartridge 12 also includes a write enable plug 70 as well as a tape identification hole reflector 72. As described hereafter the write enable plug 70 may be rotated between "safe" and "unsafe" positions. During a read operation the plug 70 is left in the "safe" position to assure against inadvertent writing on the tape. The reflector 72 includes a diagonally mounted mirror for projecting an image of a small portion of the tape upwardly through the top of the cartridge frame 36. As described hereafter this image is sensed so as to perform selected electronic functions when identifying holes in the tape appear.

The particular magnetic tape cartridge 16 shown and described is sold under the designation "Data Cartridge" by Minnesota Mining and Manufacturing Company. When used with the recorder 10, the magnetic tape may be driven in intermittent, bidirectional fashion to effect a digital data processing operation. The isoelastic drive system of such tape cartridge enables maintenance of tape tension and tape motion using a single drive motor which is described hereafter.

To install the cartridge 12 in the operative position within the recorder 10 the opposite edges 26 and 28 of the cartridge are inserted in the grooves 38 and 40 respectively of the guides 42 and 44, and the cartridge 12 is manually pushed forward into the recorder 10. The grooves 38 and 40 extend along the lengths of the guides 42 and 44 to apertures 74 and 76 respectively at the rear of the guides. The apertures 74 and 76 respectively include a pair of opposite catches 78 and 80 as well as a pair of opposite elements 82 and 84. As described in detail hereafter, the catches 78 and 80 are pivotably mounted on the housing 14, specifically the underside of the planar member 16, so as to be rotatable between a first or engaged position within the grooves 38 and 40 respectively and a second or disengaged position which is at least partially removed from the grooves 38 and 40 respectively. The catches 78 and 80 are spring loaded so as to be normally urged into the first or engaged positions. The elements 82 and 84 which are disposed within the apertures 74 and 76 adjacent the catches 78 and 80 respectively are spring loaded so as to be normally urged in a direction toward the front of the recorder 10.

Figure 4:
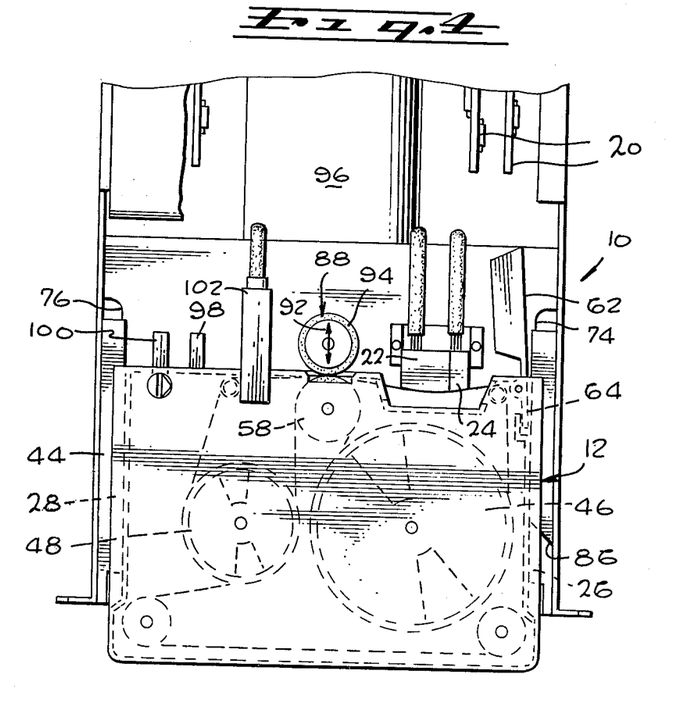
FIG. 4 is a top view of the magnetic tape cartridge recorder of FIG. 1 illustrating the tape cartridge installed in the operative position.

As the cartridge 12 is manually pushed along the guides 42 and 44 a bevelled edge 86 at the upper part of the guide 42 engages the tab 64 of the cartridge so as to force the door 62 into an opening position. As shown in FIG. 4 the door 62 rotates approximately 90° from the closed position to the open position, enabling the magnetic heads 22 and 24 to address the magnettic tape 60.

As the cartridge 12 nears the operative position, the leading ends of the opposite edges 26 and 28 thereof engage the spring-loaded catches 78 and 80 respectively so as to momentarily push the catches 78 and 80 out of engaged positions. As the leading ends or portions of the edges 26 and 28 pass the catches 78 and 80, the notches 30 and 32 approach the catches. As the notches 30 and 32 move alongside the catches 78 and 80 the catches move inwardly under the force of the spring loading thereof into the engaged positions within the notches 30 and 32. At the same time the elements 82 and 84 are engaged by the leading ends of the opposite edges 26 and 28 and are pushed out of the positions in which they normally reside against the forces exerted by the spring loading thereof. The tape cartridge 12 is now in the operative position and is held in such position by engagement of the catches 78 and 80 within the notches 30 and 32. The cartridge 12 is thus securely locked in place, and cannot be removed even by forcefully pulling on the cartridge until the catches 78 and 80 are pivoted outwardly and away from the first or engaging positions. At the same time elements 82 and 84 bear against the cartridge 12 with force as provided by the spring loading thereof. As described in detail hereafter the elements 82 and 84 serve to partially eject the cartridge 12 when the catches 78 and 80 are momentarily moved into the second or non-engaged positions by a solenoid actuated mechanism.

With the cartridge 12 locked in the operative position as shown in FIG. 4 the driven wheel 58 thereof is engaged by a drive wheel 88 mounted at the top or first end of a drive shaft 90. The drive shaft 90 is rotatably mounted within the housing 14 with the axis of elongation thereof disposed generally normal to the planar member 16 of the housing 14. As described hereafter the mounting of the drive shaft 90 is such that the upper end thereof adjacent the drive wheel 88 is spring loaded so that the longitudinal axis thereof is capable of undergoing motion in directions illustrated by an arrow 92 in FIG. 4. The drive wheel 88 is normally forced by the spring loading of the drive shaft 90 in a direction toward the driven wheel 58 so as to maintain firm engagement of the drive wheel 88 with the driven wheel 58. The outer periphery of the drive wheel 88 comprises a band 94 of elastomeric material for enhancing frictional engagement with the driven wheel 58. Bidirectional rotation of the drive wheel 88 under the control of a motor 96 rotates the driven wheel 58 to achieve driving of the magnetic tape 60 in desired fashion.

With the tap cartridge 12 in the operative position the length of magnetic tape exposed by the open door 62 is stretched across the magnetic heads 22 and 24 to permit read, write and erase operations in the usual fashion.

At the same time as the tape cartridge 12 is pushed into the operative position so as to engage the catches 78 and 80 within the notches 30 and 32 to lock the cartridge in such position, the first of a pair of spring loaded actuating arms 98 and 100 which extend upwardly through the planar member 16 is pushed rearwardly upon engagementt by the leading edge of the tape cartridge 12. This automatically initiates a series of operations in which the tape is advanced to a desired starting position under the control of the drive wheel 88 and with the aid of a sensor assembly 102 mounted on the planar member 16 so as to have the forward end thereof displaced over the tape identification hole reflector 72. The sensor assembly 102 includes phototransistors which respond to light from a light source within the assembly 102 which is reflected by the reflector 72 through identification holes in the tape. If the operation in connection with the tape cartridge 12 is to be a read operation the write enable plug 70 is placed in the "safe" position. This allows the actuating arm 100 to extend into the plug 70 so as to prevent the arm 100 from being pushed back. With the actuating arm 100 in this position the write heads cannot be energized, and inadvertent writing on the magnetic tape is prevented. In the case of a write operation the write enable plug 70 is turned to other than the "safe" position, causing the actuating arm 100 to be pushed to the rear in the same fashion as the arm 98 and thereby completing electrical circuits to the write heads.

At the end of the operation in connection with the tape cartridge 12 the tape is automatically rewound by the drive wheel 88 under the control of the sensor assembly 102. When rewind of the tape is completed the solenoid assembly, descirbed hereafter, is actuated to momentarily move the catches 78 and 80 out of the engaged positions and into the disengaged positions, permitting the elements 82 and 84 to spring forward and partially eject the cartridge 12. Thereafter the cartridge is removed by hand, and the same or a different cartridge is later installed in the recorder 10 as desired.

Figure 5:
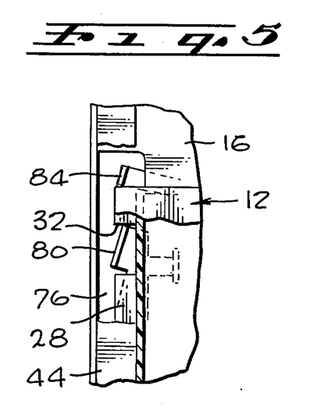
FIGS. 5 and 6 are views of particular portions of the arrangement of FIG. 1 illustrating portions of a cartridge catch arrangement in accordance with the invention.
Figure 6:
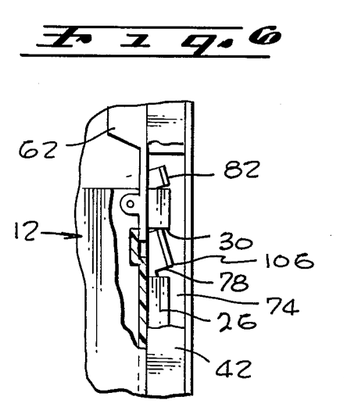
Figure 7:
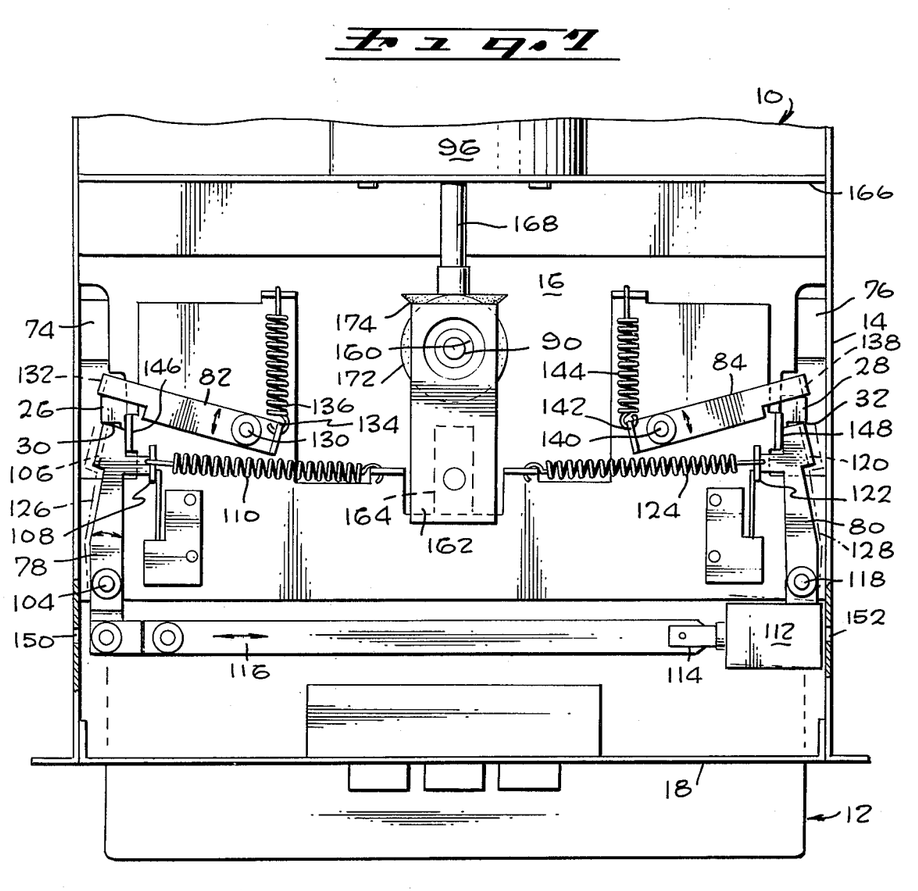
FIG. 7 is a bottom view of a portion of the arrangement of FIG. 1 illustrating the cartridge catch arrangement and a portion of the drive arrangement for the cartridge in greater detail.
Figures 8, 9:
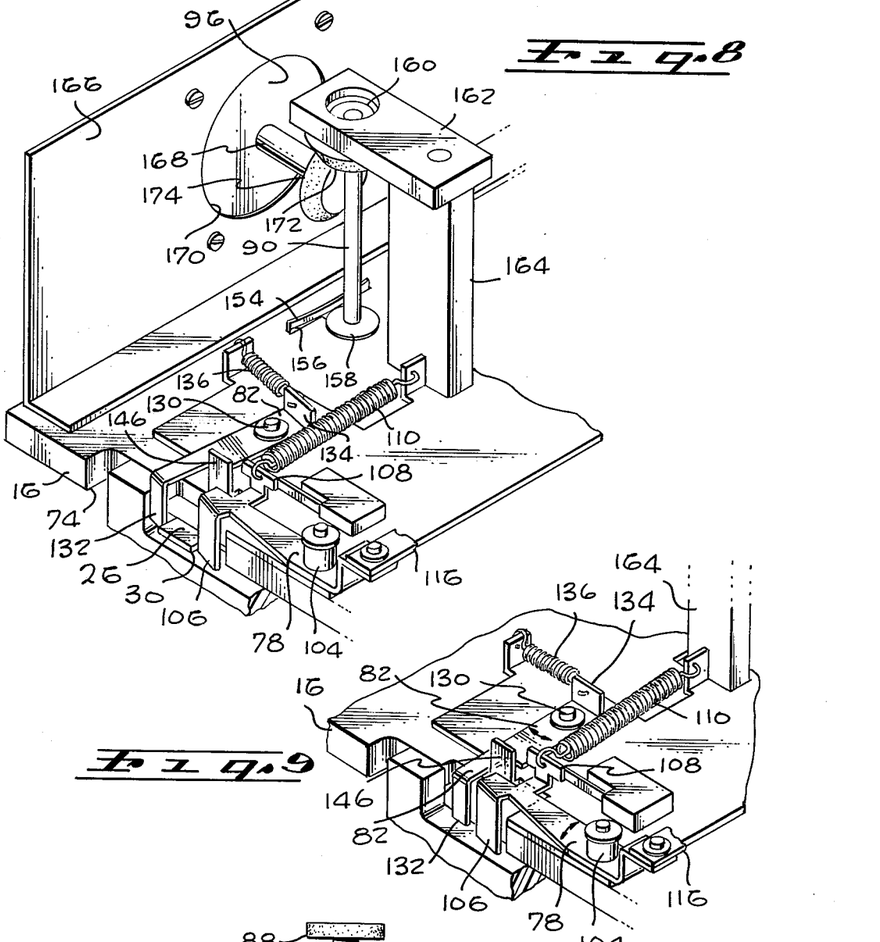
FIG. 8 is a perspective view of a portion of the inside of the arrangement of FIG. 1 illustrating portions of the cartridge catch arrangement and the driving arrangement in substantial detail.
FIG. 9 is a perspective view of a portion of the arrangement of FIG. 8 with one of the catches in a different position.

The details of the catches 78, 80 and the elements 82, 84 and their associated components are shown in FIGS. 5–9. FIG. 5 is a view looking downwardly of the lefthand catch 80 and associated element 84 with the cartridge 12 locked in the operative position. The top portion of the guide 44 has been eliminated as well as the top portion of the cartridge 12 in order to clearly show the manner in which the catch 80 and the element 84 engage the left edge 28 and the notch 32 of the cartridge 12. FIG. 6 is a view similar to that of FIG. 5 but with respect to the righthand catch 78 and associated element 82. FIG. 7 is a view looking upwardly from the bottom of the recorder 10. FIG. 8 shows the righthand catch 78 and associated element 82 in the positions which they assume when the cartridge 12 is installed in the operative position. FIG. 9 illustrates the catch 78 and the element 82 with the cartridge 12 removed from the recorder 10.

The catch 78 comprises an elongated member pivotably mounted at a point 104 to the underside of the planar member 16. An upstanding tab 106 at one end of the catch 78 is configured to be received within the notch 30. A second upstanding tab 108 adjacent the same end of the catch 78 has one end of a spring 110 coupled thereto. The opposite end of the spring 110 is anchored to the planar member 16. The spring 110 normally urges the catch 78 into the first or engaged position. Movement of the catch 78 into the second or unengaged position is accomplished by a solenoid 112 having a movable plunger 114 coupled to one end of an elongated arm 116. The opposite end of the arm 116 is pivotably coupled to the catch 78 on the opposite side of the pivot point 104 from the tabs 106 and 108. Accordingly movement of the arm 116 in a direction toward the right as seen in FIG. 7 pivots the catch 78 about the point 104 and against the urging of the spring 110 to move the catch 78 into the second or disengaged position.

The solenoid 112 is mounted in one end of the catch 80 which is pivotably mounted on the planar member 16 at a pivot point 118. The opposite end of the catch 80 includes upstanding tabs 120 and 122 in the same fashion as the catch 78. The tab 120 is configured to be received within the notch 32. The tab 122 secures one end of a spring 124 having an opposite end secured to the planar member 16 and normally urging the catch 80 into the first or engaged position.

When the solenoid 112 is energized, the plunger 114 is drawn into the solenoid. The resulting motion pivots the catch 78 in a counterclockwise direction as seen in FIG. 7 and the catch 80 in a clockwise direction as seen in FIG. 7. Both catches 78 and 80 overcome the resistance of the springs 110 and 124 to move into the second or unengaged positions. The second or unengaged position for the catch 78 is illustrated by the dotted outline 126 in FIG. 7. The second or disengaged position for the catch 80 is shown by the dotted outline 128 in FIG. 7. Any tendency for one of the catches to remain lodged within its notch while the other catch moves out of its notch in response to withdrawal of the plunger 114 into the solenoid 112 so as to prevent release of the cartridge 12 is overcome by the fact that the catches are located close to the walls of the housing 14 and will strike such walls upon movement into the unengaged positions. Thus, outward movement of both catches is insured.

With the catches 78 and 80 momentarily in the second or unengaged position as provided by energization of the solenoid 112, the tabs 106 and 120 are clear of the notches 30 and 32, and the cartridge 12 is free to move out of the operative position. As previously noted partial ejection of the cartridge 12 is accomplished by the elements 82 and 84. The element 82 is pivotably mounted to the planar member 16 at a pivot point 130 and has an upstanding tab 132 at one end thereof which bears against the cartridge. The opposite end of the element 82 has an upstanding tab 132 coupled to one end of a spring 136. The opposite end of the spring 136 is secured to the planar member 16 so as to normally urge the tab 132 in a direction tending to force the cartridge 12 out of the recorder 10. In like fashion the element 84 has an upstanding tab 138 at one end thereof, a pivot point 140 at which the element 84 is mounted on the planar member 16 and an upstanding tab 142. A spring 144 coupled between the tab 142 and the planar member 16 normally urges the tab 138 in a direction tending to force the cartridge 12 out of the recorder 10.

When the tape cartridge 12 is inserted in the recorder 10 and approaches the operative position, the corners of the opposite edges 26 and 28 of the cartridge 12 engage the tabs 106 and 120 so as to momentarily force the catches 78 and 80 out of the first or engaged positions as the cartridge 12 is pushed toward the operative position. As the notches 30 and 32 reach the tabs 106 and 120, the tabs 106 and 120 are drawn into the notches under the urging of the springs 110 and 124. The force of the springs 136 and 144 is easily overcome by the manual pushing of the cartridge 12 into the operative position. With the tabs 106 and 120 engaged with the notches 30 and 32 so as to latch the cartridge 12 in the operative position the elements 82 and 84 are held in one position thereof in which the tabs 132 and 138 engage the front corners of the edges 26 and 28 of the cartridge and tend to urge the cartridge 12 out of the recorder 10 under the force of the springs 136 and 144. When the solenoid 112 is energized so as to momentarily move the catches 78 and 80 into their second or unengaged positions, the elements 82 and 84 rotate into a second position while forcing the cartridge 12 partway out of the recorder 10. As the cartridge 12 moves out of the recorder 10 the springs 136 and 144 cause the elements 82 and 84 to assume the second positions in which they rest against a pair of upstanding tabs 146 and 148 respectively at the opposite sides of the planar member 16.

FIG. 8 shows a slightly different view of the catch 78 and the element 82 with the cartridge 12 installed in the operative position. The same view but with the cartridge 12 removed from the recorder 10 is depicted in FIG. 9. It will be seen from FIG. 9 that with the cartridge 12 removed the catch 78 remains in the first or engaged position under the urging of the spring 110. The element 82 resides in the second position against the tab 146 under the urging of the spring 136.

Figure 3:
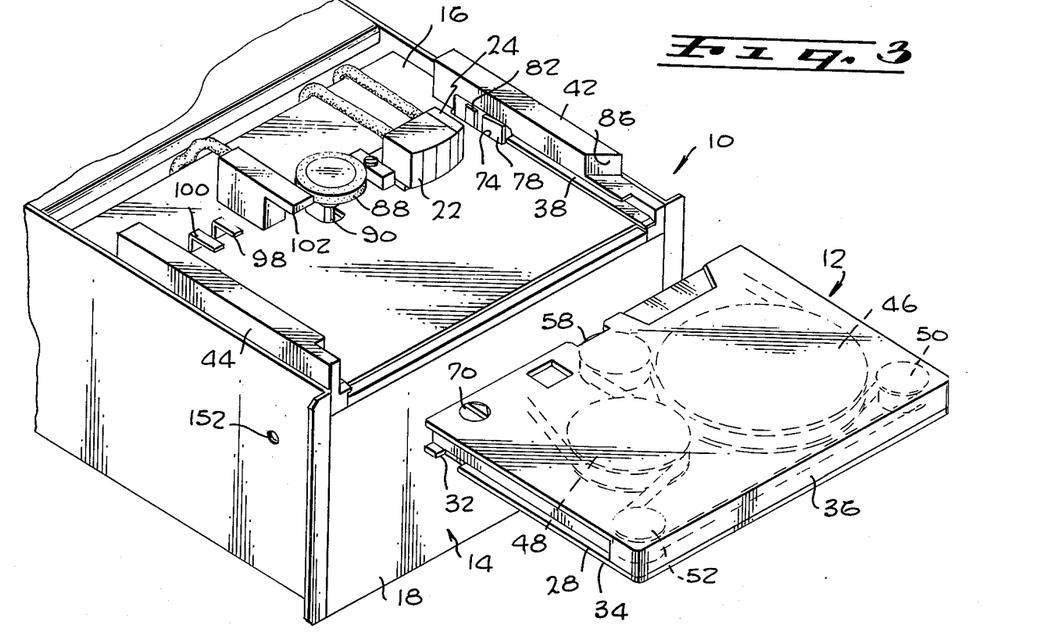
FIG. 3 is a different perspective view of a portion of the magnetic tape cartridge recorder of FIG. 1.

As seen in FIGS. 1 and 3 the housing or frame structure 14 has a pair of holes 150 and 152 on the opposite sides thereof. As shown in FIG. 7 the holes 150 and 152 are located adjacent the opposite ends of the catches 78 and 80 from the tabs 106 and 120. If the solenoid 112 cannot be energized to eject the cartridge 12 such as in the event of a power failure, the holes 150 and 152 provide access so that pointed objects can be simultaneously inserted in both holes so as to push the arm 116 and thereby the plunger 114 into the solenoid 112 far enough to disengage the tabs 106 and 120 from the notches 30 and 32 in the edges of the cartridge and thereby eject the cartridge.

Figure 10:
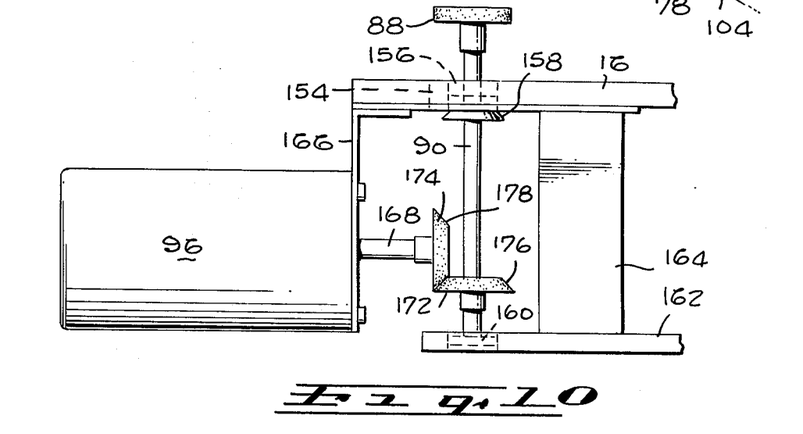
FIG. 10 is a side view of a portion of the arrangement of FIG. 1 illustrating the details of the drive arrangement.

With the tape cartridge 12 locked in the operative position in sure and positive fashion by the catch arrangement previously described, the drive wheel 88 can bear against the driven wheel 58 with considerable force to enhance the engagement therebetween. The force of the drive wheel 88 is provided in part by a spring 154 mounted within the crossbar portion of a T-shaped aperture 156 in the planar member 16. The spring 154 engages a first bearing 158 slidably mounted within the body portion of the T-shaped aperture 156 and rotatably mounting the upper end of the drive shaft 90 to the housing or frame structure 14 at the planar member 16. The lower end of the drive shaft 90 opposite the drive wheel 88 is fixedly positioned with respect to the housing or frame strucuture 14 by a second bearing 160 journaled within an elongated element 162 affixed to the planar member 16 via a support element 164. The end of the drive shaft 90 opposite the drive wheel 88 is rotatably supported by the bearing 160 but is held in fixed relation relative to the housing or frame structure 14 by the elements 162 and 164. The resulting arrangement operates the drive shaft 90 in lever arm fashion. With the lower end of the drive shaft 90 secured within the bearing 160 relative to the housing or frame structure 14, the spring 154 urges the upper bearing 158 and thereby the drive wheel 88 against the driven wheel 58 of the tape cartridge 12. The mounnting arrangement including the spring 154 can be adjusted to provide virtually any desired amount of tension between the drive wheel 88 and the driven wheel 58 since the cartridge 12 is rigidly locked in the operative position by the catches 78 and 80. Also it will be appreciated that the tension is not affected by the weight of the motor 96 which is mounted on a generally planar member 166. The member 166 is mounted on the planar member 16 so as to be generally perpendicular thereto and so as to mount the motor 96 such that the shaft 168 thereof has an axis of elongation generally normal to the axis of the drive shaft 90 and generally parallel to the planar member 16. An aperture 170 within the planar member 166 permits the motor 96 to be mounted on the opposite side of the planar member 166 from the drive shaft 90 with the motor shaft 168 being disposed on the same side of the planar member 166 as the drive shaft 90. A first bevelled wheel 172 is mounted on the drive shaft 90 on the opposite side of the planar member 16 from the drive wheel 88 and adjacent the bearing 160 near the lower end of the drive shaft 90. The wheel 172 engages and is driven by a second bevelled wheel 174 mounted at the outer end of the motor shaft 168. Outer peripheral portions 176 and 178 of the wheels 172 and 174 respectively engage each other and are comprised of elastomeric material such as neoprene or rubber to provide a resilient and damped coupling between the drive shaft 90 and the motor shaft 168.

The use of a resilient coupling between the motor 96 and the drive wheel 88 together with the rigid mounting of the motor 96 on the housing greatly minimizes or eliminates resonances of the type which cause erratic behavior and erratic engagement of the drive wheel 88 with the driven wheel 58 in many prior art systems. The location of the first bevelled wheel 172 adjacent the end of the drive shaft 90 opposite the drive wheel 88 minimizes the influence of the force exerted by the bevelled wheel 174 on the bevelled wheel 72 at the spring 154 and the drive wheel 88. Whatever influence may be present due to the use of the bevelled wheels 172 and 174 remains constant and does not vary as in those prior art systems where the drive motor is mounted on a movable arm.

It has been found that in magnetic tape cartridge recorders according to the invention, the magnetic tape can be intermittently and bidirectionally driven for digital data processing at a normal speed of 25 inches per second with forward and reverse search modes of operation as well as rewind taking place at 90 inches per second. Data transfer rates of 40,000 bits per second have been achieved with a recording density of 1,600 bits per inch. In one example of a recorder constructed and successfully tested in accordance with the invention the motor 96 is a DC motor sold under the part No. 2308-15 by Indiana General Corporation of Oglesby, Illinois. Such motor operates at 1,750 RPM at 24 volts and 25 amperes, and is used in conjunction with a high quality tachometer velocity servo system.

While the invention has been particularly shown and descirbed with reference to a preferred embodiment thereof, it will be understood by those skilled in the art that various changes in form and details may be made therein without departing from the spirit and scope of the invention.

What is claimed is:

1. An arrangement for releasably holding a magnetic tape cartridge in an operative position within a recorder, said cartridge having opposite edges which are receivable within grooves in opposite guides on the recorder for sliding movement into and out of the operative position and a notch in each of the opposite edges, comprising:

a pair of opposite catches mounted on the recorder adjacent the grooves in the opposite guides, the catches being movable into and out of an engaging position in which the catches reside within the notches in the opposite edges of a tape cartridge to hole the tape cartridge in the operative position, the catches determining the operataive position of a tape cartridge within the recorder:

means for normally biasing the catches into the operative position, the catches thereby being biased into the notches in each of the opposite edges of a tape cartridge moved into the operative position to stop and positively hold the tape cartridge in the operative position;

means responsive to an external command for moving the catches out of the engaging positions against the normal biasing to initiatae release of the tape cartridge from the recorder; and means for normally urging the tape cartridge out of the operative position whenever the tape cartridge is in the operative position, said means for normally urging being ineffective to urge the tape cartridge out of the operative position whenever the catches are in the engaging positions.

2. The invention defined in claim 1, wherein the means for normally urging comprises a pair of opposite spring-loaded elements mounted adjacent the opposite catches and bearing against the tap cartridge when the tape cartridge is in the operative position.

3. A recorder for use with a magnetic tape cartridge comprising:
   a housing;
   a pair of guides mounted on the housing in spaced-apart relation,, each of the guides having a tape-cartridge-receiving groove therein;
   a pair of catches pivotably mounted on the huosing adjacent the grooves of the different guides, each of the catches being movable between a first position within the groove and a second position at least partially removed from the groove, the first positions of the catches defining an operative position for the magnetic tape cartridge;
   a first pair of spring means coupled to the different catches, the first pair of spring means normally urging the catches into the first positions, the catches extending into apertures in a magnetic tape cartridge positioned in the operative position to positively hold the magnetic tape cartridge in the operative position; and
   means coupled to the pair of catches for moving the catches into the second positions against the urging of the pair of spring means in response to an external command to initiate release of a magnetic tape cartridge from the operative position, said means for moving the catches into the second positions comprising a solenoid mounted on one of the catches and having a movable plunger, and an elongated arm coupled between the plunger and the other one of the catches.

4. A recorder for use with a magnetic tape cartridge comprising:
   a housing;
   a pair of guides mounted on the housing in spaced-apart relation, each of the guides having a tape-cartridge-receiving groove therein;
   a pair of catches pivotably mounted on the housing adjacent the grooves of the different guides, each of the catches being movable between a first position within the groove and a second position at least partially removed from the groove, the first positions of the catches defining an operative position for the magnetic tape cartridge;
   a first pair of spring means coupled to the different catches, the first pair of spring means normally urging the catches into the first positions, the catches extending into apertures in a magnetic tape cartridge positioned in the operative position to positively hole the magnetic tape cartridge in the operative position;
   means coupled to the pair of catches for moving the catches into the second positions against the urging of the pair of spring means in response to an external command to initiate release of a mamgnetic tape cartridge from the operative position; and
   a pair of elements pivotably mounted on the housing adjacent the different catches, each of the elements being movable into and out of an operative position within the grooves of the guides, and a second pair of spring means coupled to the different elements, the second pair of spring means normally urging the elements into the operative positions.

5. For use in an arrangement in which a magnetic tape cartridge is releasably held in an operative position on a recorder, the recorder having opposite guides having grooves therein for receiving the opposite edges of the tape cartridge and at least one of the edges of the tape cartridge having a notch therein, the improvement comprising at least one catch pivotably mounted on the recorder adjacent one of the guides and movable between a first position within the groove of the guide in which the catch engages the tape cartridge at the notch within the edge thereof to stop and positively hold the tape cartridge in the operative position and a second position away from the groove of the guide and outside of the notch within the edge of the cartridge, a spring coupled between the catch and the recorder for normally urging the catch into the first position, and electrically actuated means for overcoming the urging of the spring and moving the catch into the second position when actuated by an electrical signal to initiate release of a tape cartridge from the recroder, the electrically actuated means including a solenoid, and an element pivotably mounted on the recorder and a second spring coupled between the element and the recorder, the second spring normally urging the element into a position against a tape cartridge when the cartridge is installed within the recorder.

* * * * *

UNITED STATES PATENT OFFICE
CERTIFICATE OF CORRECTION

Patent No. 3,976,262          Dated August 24, 1976

Inventor(s) Charles J. Kennedy

It is certified that error appears in the above-identified patent and that said Letters Patent are hereby corrected as shown below:

Column 1, line 43, "tap" should read --tape--; line 61, "positiotn" should read -- position--. Column 2, line 1, "tap" should read --tape--; line 7, "drive" should read --driven--. Column 3, line 4, "positioned" should read --positions--. Column 4, line 64, after "58" and before "belt", strike "and" and substitute --the--; line 64, after "in" and before "fashion", insert --a--. Column 5, line 53, "magnettic" should read --magnetic--. Column 6, line 37, "tap" should read --tape--; line 48, "engagementt" should read --engagement--; line 54, "displaced" should read --disposed--. Column 7, line 7, "descirbed" should read --described--; line 53, after "mounted" and before "one", strike "in" and substitute --on--. Column 9, line 43, "mounnt-" should read -- mount- --. Column 10, line 14, "72" should read --172--; line 36, "descirbed" should read --described--; line 54, "hole" should read --hold--; line 65, "initiatae" should read --initiate--. Column 11, line 8, "tap" should read --tape--; line 14, after "relation," strike the second comma (","); line 16, "huosing" should read --housing--. Column 12, line 9, "hole" should read --hold--; line 14, "mamgnetic" should read --magnetic--; line 42, "recroder" should read --recorder--.

Signed and Sealed this sixteenth Day of August 1977

[SEAL]

Attest:

RUTH C. MASON
*Attesting Officer*

C. MARSHALL DANN
*Commissioner of Patents and Trademarks*